United States Patent [19]
Howell

[11] 3,912,634
[45] Oct. 14, 1975

[54] FILTER CARTRIDGE FOR A MAGNETIC SEPARATOR

[75] Inventor: William F. Howell, Erie, Pa.

[73] Assignee: Eriez Manufacturing Company, Erie, Pa.

[22] Filed: May 1, 1974

[21] Appl. No.: 465,906

[52] U.S. Cl. .................. 210/222; 55/486; 55/525
[51] Int. Cl.² ........................................ B01D 35/06
[58] Field of Search ...... 210/222, 223; 55/443, 487, 55/525; 209/223, 232, 214, 224

[56] References Cited
UNITED STATES PATENTS

| | | | |
|---|---|---|---|
| 2,329,893 | 9/1943 | Girard | 210/222 |
| 2,490,635 | 12/1949 | Kisch | 210/223 |
| 2,636,572 | 4/1953 | Fleisher | 55/525 X |
| 2,951,586 | 9/1960 | Moriya | 210/223 |
| 2,993,601 | 7/1961 | Moriya | 210/223 |
| 3,567,026 | 3/1971 | Kolm | 210/222 |
| 3,770,629 | 11/1973 | Nolan | 210/222 |

*Primary Examiner*—Theodore A. Granger

[57] ABSTRACT

A filter cartridge for a magnetic separator for removing fine magnetic particles from a liquid or gas is disclosed. The filter cartridge is made up of alternate layers of expanded magnetic stainless steel mesh and magnetic stainless steel wool. The expanded metal mesh and steel wool can be of plain steel where non-corrosive liquids or gases will be encountered or stainless steel for corrosive liquids. The laminates are packed into non-magnetic steel containers to prevent movement of the laminates in relation to each other when they enter or leave the intense magnetic fields encountered in this type of separator.

3 Claims, 5 Drawing Figures

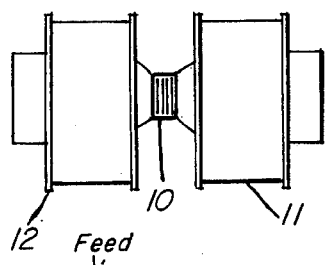
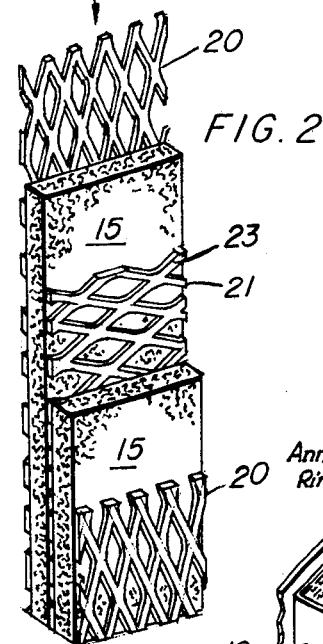
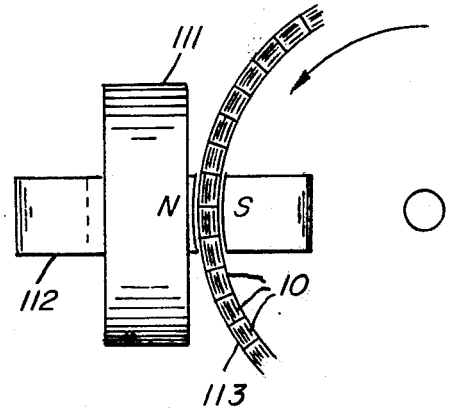
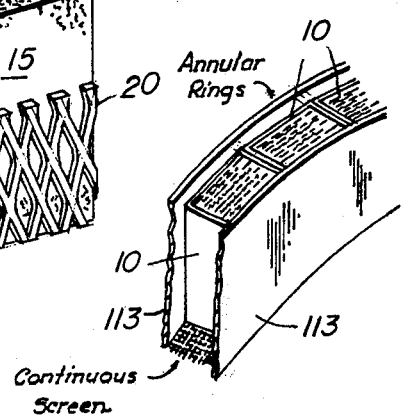
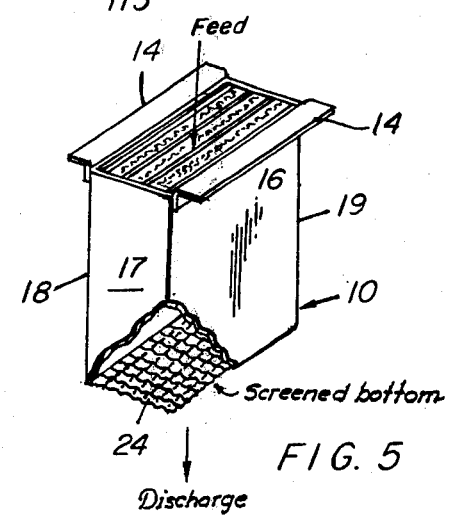

FILTER CARTRIDGE FOR A MAGNETIC SEPARATOR

GENERAL DESCRIPTION OF THE INVENTION

Applicant has tested various filter media in connection with filtering of gold mine cyanide residue, and other similar materials. Filter media of the type shown in the United States Patents listed below were tested. All of these filter media produced results which fall far short of the needs of a particular project.

U.S. Pat. Nos. 3,375,925  3,627,678  3,567,026
3,021,007

Applicant then discovered that a combination of filter media of the combination of materials disclosed hereinafter produced results more than eight times as good as his previous best results and even exceeded the requirements of the project.

The filter media that made up the preferred embodiment of the media tested were alternate layers of stainless steel laminates with stainless steel wool sandwiched between them. Each alternate layer of expanded metal had its longitudinal axis at right angles to the longitudinal axis of the adjacent layer.

The expanded metal mesh is available in a range of mesh sizes, and since it is anticipated that not all products will respond to the same mesh size, experiments and experience will dictate the selection of the most effective mesh for each particular product. The same is anticipated for the stainless steel wool matrix, which is available in six grades. To avoid physical blocking, the solids in slurries directed through the filter should range in size from approximately a maximum of −325 mesh tyler to micron and sub-micron particle sizes.

When packs consisting of compacted expanded metal mesh only are placed between the north and south poles of the referenced high intensity magnetic separators, the intense magnetic fields to which they are exposed, induce the entire pack as one mass and although there are many sharp particles and edges where very high magnetic gradients exist, there is much shorting out of the main magnetic field.

This same is true when steel balls are used as a matrix. It is also true when other materials such as spiral rods, nuts, bolts, grooved plates, and other material with relatively large steel masses are used. On the other extreme, if only steel wool were to be used, there would be many very desirable sharp points and edges with high gradients but, because of the relatively small mass of steel, the normal gradient between the magnet poles would be almost like an open air gap and there would be very little magnetic attraction or induction near the center between the poles. Furthermore, if the steel wool were to be compressed to a more solid mass, it would be subject to serious physical plugging problems.

The present application solves all of the foregoing problems by using the expanded steel mesh at spaced intervals with steel wool between. This avoids the shorting out of the magnetic fields and at the same time induces the steel mesh so highly that it, in turn, induces every sharp point and edge of every fiber of the steel wool with a maximum magnetic gradient, which is the necessary characteristic in the attraction of fine and weakly magnetic particles.

Another advantage of the present invention is that by not having to compress the steel wool, the problem of plugging and rinsing is eliminated, thereby increasing the capacity of the magnetic separators.

Another advantage of the present invention is that the magnetic flux is uniformly distributed throughout the magnetic separation area, and the slurry to be separated is uniformly distributed throughout the magnetic separation area.

Yet another advantage of the present invention is that all perpendicular sides of each of the filter packs are non-magnetic stainless steel, facilitating removal and replacement, because of wear, or for cleaning in case of accidental overloading.

The bottom of each rectangular non-magnetic stainless steel filter enclosure is covered with non-magnetic stainless angular steel expanded metal mesh, perforated sheet, screen or the like, securely welded in place.

Another advantage of the present invention is that the filter packs can be adapted to and can improve the performance of any presently known high intensity magnetic separator, whether wet or dry, continuous or batch types.

REFERENCE TO PRIOR ART

The following is a list of prior art patents:
U.S. Pat. No. 3,375,925 — J. H. Carpenter — Apr. 2, 1968
U.S. Pat. No. 3,627,678 — Peter Marston — Dec. 14, 1971
U.S. Pat. No. 3,567,026 — Henry H. Kolm — Mar. 2, 1971
U.S. Pat. No. 3,021,007 — Jones — Feb. 13, 1962

OBJECTS OF THE INVENTION

It is an object of the invention to provide an improved magnetic separator.

Another object of the invention is to provide a magnetic filter wherein an improved structure of magnetic filter media is provided.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a top view of the magnetic separator according to the invention.

FIG. 2 is a broken away view showing alternate layers of expanded metal and layers of steel wool disposed between the expanded metal.

FIG. 3 shows a filter cartridge that is disposed in another embodiment of a magnetic separator.

FIG. 4 shows a partial view of the embodiment of the invention shown in FIG. 3.

FIG. 5 shows an enlarged view of a magnetic separator according to the invention.

DETAILED DESCRIPTION OF THE DRAWINGS

Now with more particular reference to the drawings, the filter cartridge 10 according to the invention is shown in combination with the electromagnetic poles 11 and 12 in FIG. 1. The magnetic cartridge 10 is packed into the non-magnetic stainless steel container indicated in FIG. 5, having sides 16, 17, 18, and 19 that form a container open at each end and having the bottom end closed by screen 24. Angles 14 are attached to the upper end of the cartridge having one flange fixed to the upper end and the other flange extending outwardly by way of a support.

Alternate layers of expanded stainless steel have stainless steel wool 15 sandwiched between them which make up the filter media. Each alternate layer of stainless steel wool is indicated at 20. The longitudinal axis of the openings in the expanded metal is disposed in the direction of flow and the other alternate rows 21 have their longitudinal axis perpendicular to the direction of flow.

In the embodiment of the invention shown in FIG. 3 and FIG. 4, the flow channel is in the form of an annular ring made up of spaced sides 113 and a screen 124 at the bottom define a passage in which the cartridges 10 are disposed. The annular ring 113 may rotate, moving the filter cartridges through the path between the magnetic poles to magnetize the filter media intermittently as it passes between the magnetic poles N and S of the core member 112, which is energized by the coil 111. As the filter cartridges move out of the magnetic field, they are demagnetized.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A magnetic separator comprising a flow channel member made up of a non-magnetic material,
   spaced magnetic members supported on opposite sides of said flow channel providing a magnetic field through said flow channel,
   means supporting said flow channel between said magnetic members,
   a filter element in said flow channel comprising a container rectangular in cross section and open at its ends and made of non-magnetic material,
   filter media in said element,
   said filter media comprising a plurality of spaced layers of steel wool and alternate layers of magnetic expanded metal material,
   said layers of expanded metal material having a width substantially equal to the inside width of said container,
   said magnetic expanded metal material being disposed in planes generally parallel to said container sides and extending from one end of said container to the other,
   said layers of steel wool being generally rectangular in cross section and extending substantially from one end of said container to the other substantially completely filling the spaces between said magnetic expanded metal material, providing a fluid flow path through said steel wool substantially from one end thereof to the other whereby substantially all fluid flows through said layers of steel wool,
   spaced openings extending over the entire area of said magnetic expanded metal material,
   said openings being bounded by sharp edges, whereby magnetic flux is concentrated in symmetrical patterns throughout said steel wool.

2. The combination recited in claim 1 wherein said spaced openings in said expanded metal material are elongated and,
   said spaced openings in each said layer of said expanded metal material has the longitudinal axis thereof disposed at right angles to the openings in the layer adjacent thereto.

3. The magnetic separator recited in claim 1 wherein the said openings of said expanded metal material are formed by slits in said material and the said material is stretched laterally providing generally diamond-shaped openings.

* * * * *